United States Patent [19]

Herkner

[11] 3,885,339
[45] May 27, 1975

[54] FISHING LURE BODY

[76] Inventor: Edward C. Herkner, 4407 Plum St., Boise, Idaho 83703

[22] Filed: May 11, 1973

[21] Appl. No.: 359,296

[52] U.S. Cl. .............. 43/42.05; 43/17.1; 43/42.36; 43/42.45
[51] Int. Cl............................................ A01k 85/00
[58] Field of Search............. 43/42.05, 42.36, 42.45, 43/42.46, 42.48

[56] References Cited
UNITED STATES PATENTS

| 2,175,635 | 10/1939 | Mertens | 43/42.46 |
| 2,288,009 | 6/1942 | Matasy et al. | 43/42.36 |
| 2,574,293 | 11/1951 | Sabin et al. | 43/42.36 X |

Primary Examiner—Robert Peshock
Assistant Examiner—Daniel J. Leach
Attorney, Agent, or Firm—John W. Kraft; Charles L. Kraft, II

[57] ABSTRACT

A fishing lure body comprising a cylindrical portion and a pair of cone-like portions disposed with their bases at the terminal ends of the cylindrical portion. A spiralling groove is cut into the cylindrical portion and a rectilinear bore or hole is cut through the body and cone-like portions having a wide diameter portion running from one of the terminal ends of the fishing lure body to a point more than halfway through the cylindrical portion. A narrower hole portion is disposed from the opposite end of the lure body to intersect and align with the wide diameter hole portion interiorly of the lure body. The fishing lure body may be employed with spinner, trolling rudders and the like.

2 Claims, 3 Drawing Figures

FISHING LURE BODY

FIELD OF INVENTION

The present invention relates to fishing lures and more particularly to fishing lure bodies.

DESCRIPTION OF THE PRIOR ART

A fishing lure body is a substantially cylindrical, rectilinearly bored member which is carried by its rectilinear hole on a pin such as a suitable hook, which is tied to a fishing line. A fishing lure body is typically employed with spinner, and may include a trolling rudder. Fishing lures have also been employed with fly-type feathers and the like. The outer configuration of the substantially cylindrical walls of the body have been found to effect the lure's characteristics of frequency of sound in the water and tracking. This characteristic is a primary element in the performance of a lure in attracting fish. Thus, a variety of lure configurations have been developed including smooth, randomly roughed, and grooved lure bodies. Another important characteristic affecting the performance of a lure has been found, particularly in bait fishing, to be the proximity of the hook with respect to the lure body.

Accordingly, it is an object of the present invention to provide a fishing lure body having spiralled grooves of a particular predetermined depth and configuration.

It is an object of the present invention to provide a centrally rectilinearly disposed hole which is operable to receive the upper shank portions of a hook, a hook pin, or other suitable tackle hardware to permit the fishing lure to be fabricated in a predetermined juxtaposition of the hook with the lure components.

These and other objects shall become apparent from the description following, it being understood that modifications may be made without affecting the teachings of the invention here set out.

SUMMARY OF THE INVENTION

The fishing lure body comprises a cylindrical portion, a pair of cone-like portions disposed with their bases at the terminal ends of the cylindrical portion, a spiralling groove cut into the cylindrical portion and a rectilinear bore or hole having a wide diameter portion running from one end of the fishing lure body to a point more than half way through the cylindrical portion and a narrower hole portion disposed from the opposite end of the lure body to the interior end of the wide diameter hole portion. The fishing lure body may be employed with spinner, trolling rudders and the like.

A more thorough and comprehensive understanding may be had from the detailed description of the preferred embodiment when read in connection with the drawings forming a part of this specification.

Figure 1:
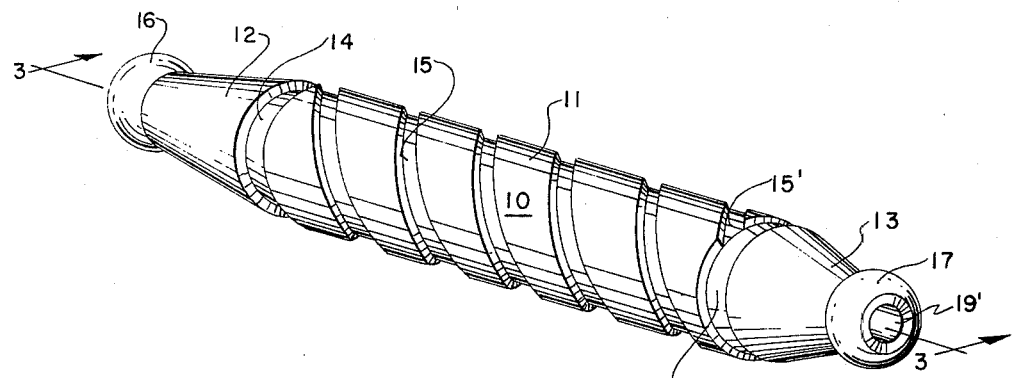
FIG. 1 is a perspective view of the fishing lure body of this invention.
Figure 2:
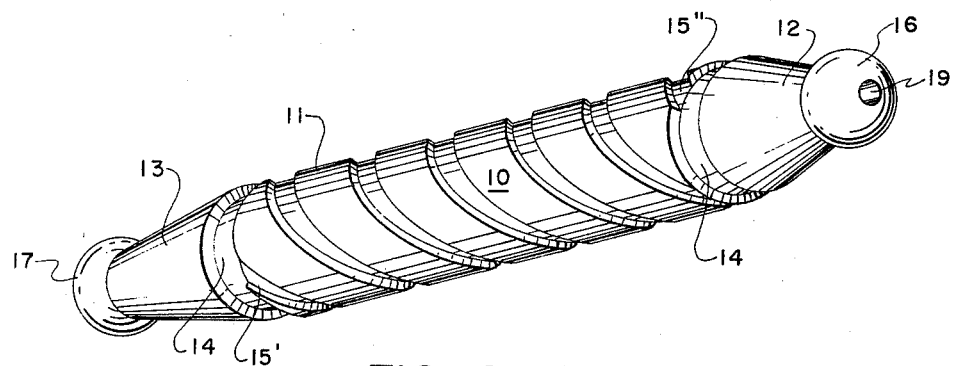
FIG. 2 is a bottom perspective view of the article of FIG. 1 from the opposite end.

DETAILED DESCRIPTION OF THE PREFERRED EMBODIMENT:

Referring now to the drawings and more particularly to FIGS. 1 and 2, the fishing lure body of this invention is shown to advantage and generally identified by the numeral 10. The fishing lure body 10 comprises a cylindrical portion 11, a cone-like portion 12 fastened with its base at one of the terminal ends of the cylindrical portion 11 and a cone-like portion 13 fastened with its base at the end opposite the portion 12 of the cylindrical portion 11.

A groove 14 is cut transversely and circumferentially at each of the terminal ends on the cylindrical walls of the cylindrical portion 11. The cylindrical portion 11 is also provided with a spiralling groove 15 which may comprise a pair of modified acme-threads formed by a pair of thread starts 15' and 15''. A substantially spherical portion 16 is provided about the apex of the cone-like portion 12. Similarly, the apex of the cone-like portion 13 is provided with a substantially spherical portion 17. the spherical portions 16 and 17 are intended to reduce wear of fishing lure members contacting body 10.

Figure 3:
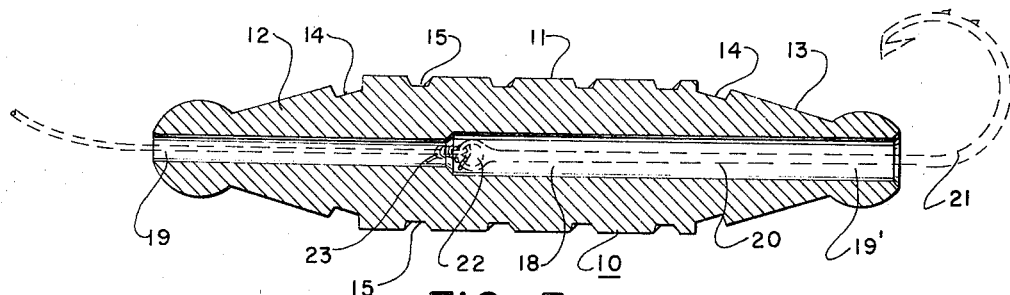
FIG. 3 is a cross-sectional view taken along the line 3—3 in FIG. 1 shown with leader, connecting swivel, and hook in broken lines for illustrative purposes.

As shown in FIGS. 1, 2 and 3, the fishing lure body 10 is provided with a countersink bore 18 bored along its rectilinear axis. The countersink bore 18 includes a narrow bore 19 and a substantially wider countersink bore or hole 19'. The narrow bore 19 is bored from the terminal end of the body 10 having the conelike portion 12 to a point less than halfway through the body 10. The wider bore 19' is bored from the terminal end of the body 10 having the cone-like portion 13, to intersect and axially align with the narrow bore 19.

As shown in FIG. 3, the fishing lure body 10 is carried on the shaft portion 20 of a fishing hook 21. The shaft portion 20 may be slidably engaged into the wide bore 19' until the eye 22 of the hook 21 abuts the countersink-like portion provided by the junction of the wide bore 19' and narrow bore 19. The narrow bore 19 may carry fishing line or leader line, and connector swivel 23 which tie to the hook 21 at the eye 22. It may be seen that the extent of the depth to which the wide bore 19' is bored will effectively determine the exposure of the hook 21 from the body 10. This predetermined exposure of the hook 21 may of course be varied according to species and waters. It is to be understood that spacing means may be used in the bore 19' on the swivel 23 and hook shaft portion 20 to vary penetration of the hook into the body 10.

In operation, the fishing lure body 10 moves through the water substantially along its rectilinear axis in response to a reel or movement of a boat. The spiraling groove 15 is operable to set up a peculiar frequency, as sound, in the water. The sound has peculiar, advantagous effect in attracting fish to the hook 21 and stimulating fish to bite. It has been observed that the circumferential grooves 14 provide additional specific turbulences about the body 10 adding to the effectiveness of stimulating the fish. Accessories may be attached about the lure body 10 to accentuate motion, and to reflect light. Spinners (not shown) of any of a variety of types may be secured to the fishing line in conjunction with the body 10. A trolling rudder (not shown) may be provided below the cone-like portion 13.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus with- out altering the inventive concepts and principles embodied therein. Hence, it is intended that the scope of the invention be limited only to the extent indicated in the appended claims.

I claim:
1. A fishing lure body comprising a cylindrical portion, a pair of cone-like portions disposed with their bases at said terminal ends of said cylindrical portion, a spiralling groove cut into said cylindrical portion, and said body and portions being bored along the central rectilinear axis to include a wide diameter bore disposed from one end of one of said cone-like portions more than half way through said cylindrical portion and a narrower bore disposed from the end of the other cone-like portion to intersect and axially align with said wide bore portion, each of the terminal ends of said exterior cylindrical walls being provided with a transverse circumferential groove.

2. The article of claim 1 including a spherical portion provided with an entranceway to said bore disposed about the apexes of each of said cone-like portions.

* * * * *